(12) United States Patent
Duelli et al.

(10) Patent No.: US 8,567,957 B2
(45) Date of Patent: Oct. 29, 2013

(54) ACTIVE POLARIZATION SWITCH FOR SPECKLE REDUCTION IN LASER PROJECTION SOURCES

(75) Inventors: Markus Duelli, Seattle, WA (US); Mark O. Freeman, Snohomish, WA (US); Christian Dean DeJong, Sammamish, WA (US); Alban N. Lescure, Les Mureaux (FR)

(73) Assignee: Microvision, Inc., Redmond, WA (US)

( * ) Notice: Subject to any disclaimer, the term of this patent is extended or adjusted under 35 U.S.C. 154(b) by 339 days.

(21) Appl. No.: 13/179,828

(22) Filed: Jul. 11, 2011

(65) Prior Publication Data

US 2013/0016321 A1    Jan. 17, 2013

(51) Int. Cl.
  *G03B 21/14* (2006.01)
  *G02F 1/1335* (2006.01)
  *H04N 3/02* (2006.01)

(52) U.S. Cl.
  USPC ................................ 353/20; 348/195; 349/5

(58) Field of Classification Search
  USPC .......... 353/7, 8, 20, 31, 30, 94; 359/465, 462; 349/5, 7–9; 348/42, 51, 195, 201, 203, 348/266
  See application file for complete search history.

(56) References Cited

U.S. PATENT DOCUMENTS

| 2006/0023164 A1 | 2/2006 | Sagaguchi et al. |
| 2007/0153235 A1* | 7/2007 | Morikawa et al. ............... 353/20 |
| 2011/0242490 A1* | 10/2011 | Itoh ................................... 353/8 |

FOREIGN PATENT DOCUMENTS

| WO | WO0157581 | 8/2001 |
| WO | WO2010125562 | 11/2010 |
| WO | WO2011037039 | 3/2011 |

OTHER PUBLICATIONS

Microvision, Inc., , "ISR and Written Opinion", ISR and Written Opinion for PCT Appl. No. PCT/US2012/045377.

* cited by examiner

*Primary Examiner* — William C Dowling
*Assistant Examiner* — Ryan Howard
(74) *Attorney, Agent, or Firm* — Kevin D. Wills

(57) ABSTRACT

A laser-based imaging system (200) is configured to reduce perceived speckle in images (201). The imaging system (200) includes one or more laser sources (207), a light modulator (204) configured to produce the images (201) with light (205) from the laser sources (207), and one or more active polarization switches (206) disposed in an optical path of the imaging system (200). The active polarization switch (206) is configured to alternate a polarization orientation of the light in synchrony with an image refresh cycle of the system. The active polarization switch can be clocked in accordance with a clocking angle to optimize speckle reduction. Additionally, one or more light preconditioners (991,992) may be used to help optimize speckle reduction.

5 Claims, 10 Drawing Sheets

ACTIVE POLARIZATION SWITCH FOR SPECKLE REDUCTION IN LASER PROJECTION SOURCES

BACKGROUND

1. Technical Field

This invention relates generally to laser projection systems, and more particularly to a laser-based projection system employing active polarization switches to reduce speckle perceived by a viewer.

2. Background Art

Laser projection devices facilitate the production of brilliant images created with vibrant colors. Laser projection systems are generally brighter, sharper, and have a larger depth of focus than do conventional projection systems. Further, the advent of semiconductor lasers and laser diodes allows laser projection systems to be designed as compact projection systems that can be manufactured at a reasonable cost. These systems consume small amounts of power yet deliver bright, complex images.

One practical drawback associated with using lasers in projection systems is the image artifact known as "speckle." Speckle occurs when a coherent light source is projected onto a randomly diffusing projection surface. Laser light is highly coherent. Accordingly, when it reflects off a rough surface, components of the light combine with other components to form patches of higher intensity light and lower intensity light. In a detector with a finite aperture such as a human eye, these varied patches of intensity appear as "speckles," meaning that some small portions of the image look brighter than other small portions. This spot-to-spot intensity difference can vary depending on observer's position, which makes the speckles appear to change in time when the observer moves.

Turning now to FIG. 1, illustrated therein is a prior art system 100 in which an observer 102 may perceive speckle. Specifically, a coherent light source 101, such as a semiconductor-type or standard laser, delivers a coherent beam 104 to a modulation and scanning device 103. The modulation and scanning device 103 modulates the coherent beam 104 into a modulated and scanned coherent beam 105 to form an image on a projection medium, shown illustratively in FIG. 1 as a projection screen 107.

The surface of the projection screen 107 has a random roughness, i.e., as it includes tiny bumps and crevices that are randomly distributed. The reflected light 108 therefore includes portions that combine and other portions that cancel. As a result, the observer 102 views an image 106 that appears to be "speckled." The presence of speckle often tends to perceptibly degrade the quality of the image produced using the laser projection system.

There is thus a need for an improved speckle-reducing system for use with laser-based projection systems.

Figure 1:
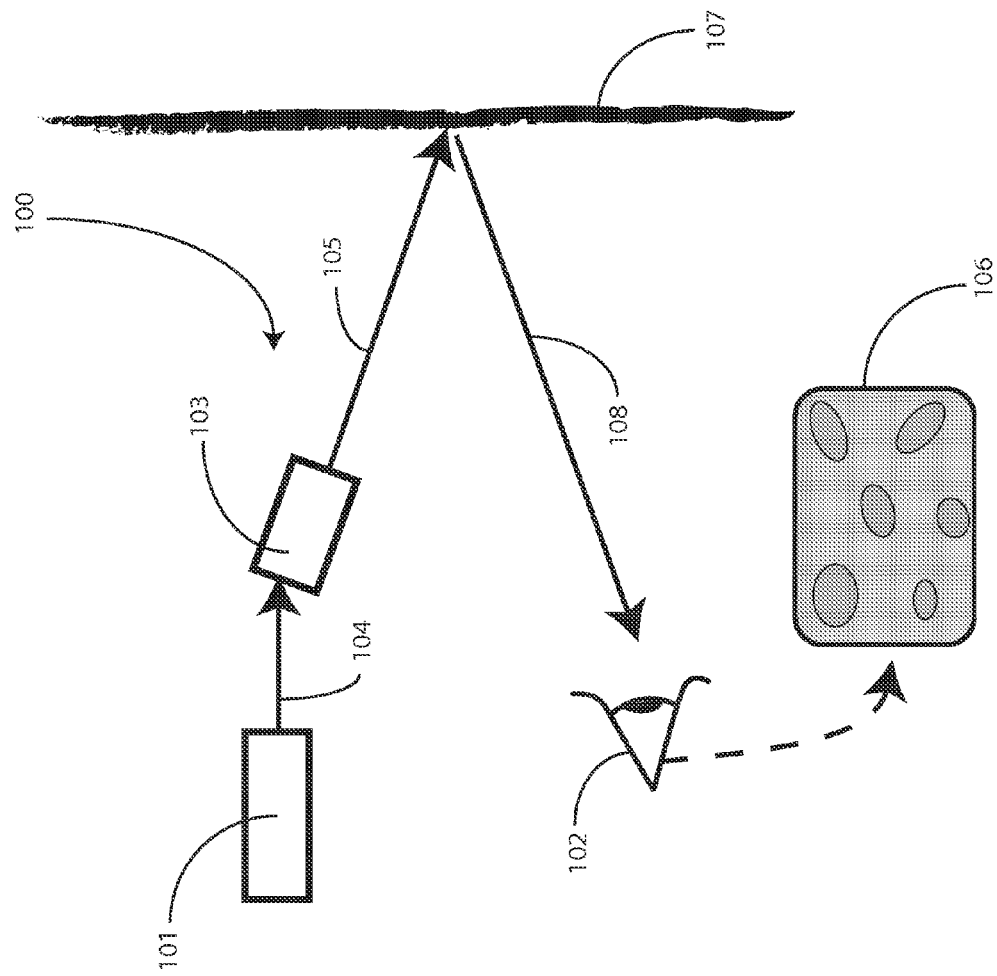
FIG. 1 illustrates a prior art laser projection system exhibiting speckle.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to an imaging system configured to reduce perceived speckle. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of reducing speckle as described herein. The non-processor circuits may include, but are not limited to, microprocessors, scanning mirrors, image modulation devices, memory devices, clock circuits, power circuits, and so forth. As such, these functions may be interpreted as steps of a method to perform speckle reduction. Alternatively, some or all functions could be implemented by a state machine that has no stored program instructions, or in one or more application specific integrated circuits, in which each function or some combinations of certain of the functions are implemented as custom logic. Of course, a combination of the two approaches could be used. It is expected that one of ordinary skill, notwithstanding possibly significant effort and many design choices motivated by, for example, available time, current technology, and economic considerations, when guided by the concepts and principles disclosed herein will be readily capable of generating such programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a laser-based image projection system capable of reducing speckle by selectively altering the polarization orientation of some or all of a beam being delivered to a light modulator or projection surface. In one embodiment, the polarization orientation is altered about ninety degrees between successive image refresh sweeps to introduce "polarization diversity" into the scanned beam, thereby reducing perceived speckle.

In one embodiment, an active polarization switch, which can be a twisted nematic liquid crystal device, a ferroelectric liquid crystal device, or other electronically or mechanically switchable device capable of altering the polarization orientation of an incident beam, is placed in an optical path of a projection system. For example, the active polarization switch can be placed between either one or more laser sources and a light modulator, or between the light modulator and a projection surface. The active polarization switch is configured to deliver, as an output, a first polarization orientation during a first image refresh sweep, and another polarization orientation during a sequentially subsequent image refresh sweep. Illustrating by example, the first polarization orientation may be vertically polarized, while the second polarization orientation may be orthogonally oriented with respect to the first, i.e., horizontally polarized. Since the two polarization states are substantially orthogonal, any resultant speckle pattern will be substantially uncorrelated in an observer's eye. When the user's eye time averages the sequentially subsequent sweeps, the two uncorrelated speckle patterns lead to a perceived speckle reduction by as much as nearly thirty percent.

In one embodiment, a twisted nematic liquid crystal device serves as the active polarization switch. Control circuitry within the projection system selectively applies a voltage to the twisted nematic crystal material alternately between image refresh sweeps, thereby causing the light used to create images to have a polarization orientation that varies by, in one embodiment, ninety degrees from sweep to sweep. Accordingly, two uncorrelated speckle patterns result. Time averaging by the viewer's eye results in a perceived speckle reduction.

In another embodiment, a ferroelectric liquid crystal device is used as the active polarization switch. The ferroelectric liquid crystal device can be configured as a bistable device having a first "optical axis" orientation and a second optical axis orientation. In industry terms, the optical axes in a bistable ferroelectric device are separated by "tilt angle." The tilt angle represents an angle between bistable optical orientations of the optical axis defined by mesogens of the ferroelectric liquid crystal material. By designing the thickness of the ferroelectric liquid crystal device to perform like a half-wave retarder for a predetermined wavelength in one of the two states, and by selecting a tilt angle of about forty-five degrees, incident light of the predetermined wavelength can be modified to have a polarization orientation that varies by about ninety degrees from sweep to sweep. Accordingly, two uncorrelated speckle patterns result. Time averaging by the viewer's eye results in a perceived speckle reduction.

Embodiments of the present invention offer many advantages over prior art speckle reduction techniques. To begin, embodiments of the invention are readily and easily manufactured. For example, in one embodiment that will be described below, speckle can be reduced by twenty percent or more without deleteriously affecting resolution of the resulting image. Additionally, many of the tolerances required for suitable speckle reduction are relatively relaxed, thereby reducing manufacturing cost.

A second advantage of embodiments of the present invention is that the overall brightness of the laser projection system is not adversely affected by the polarization alteration being performed by the active polarization switch. Another advantage of embodiments of the present invention can be used with other speckle mitigation techniques, such as, but not limited to, wavelength diversity or frame-to-frame averaging of uncorrelated speckle patterns techniques.

A fourth advantage of embodiments of the present invention, when employed in scanned laser projection systems, is that polarization diversity can be introduced into a pre-scanned beam without the need for post-scan or post-projection optical elements. Said differently, speckle is reduced without requiring optical elements such as birefringent crystals, lenses, and the like. Additionally, the polarization diversity can be introduced while preserving the relatively long depth of focus afforded by laser-based scanning systems.

Figure 2:
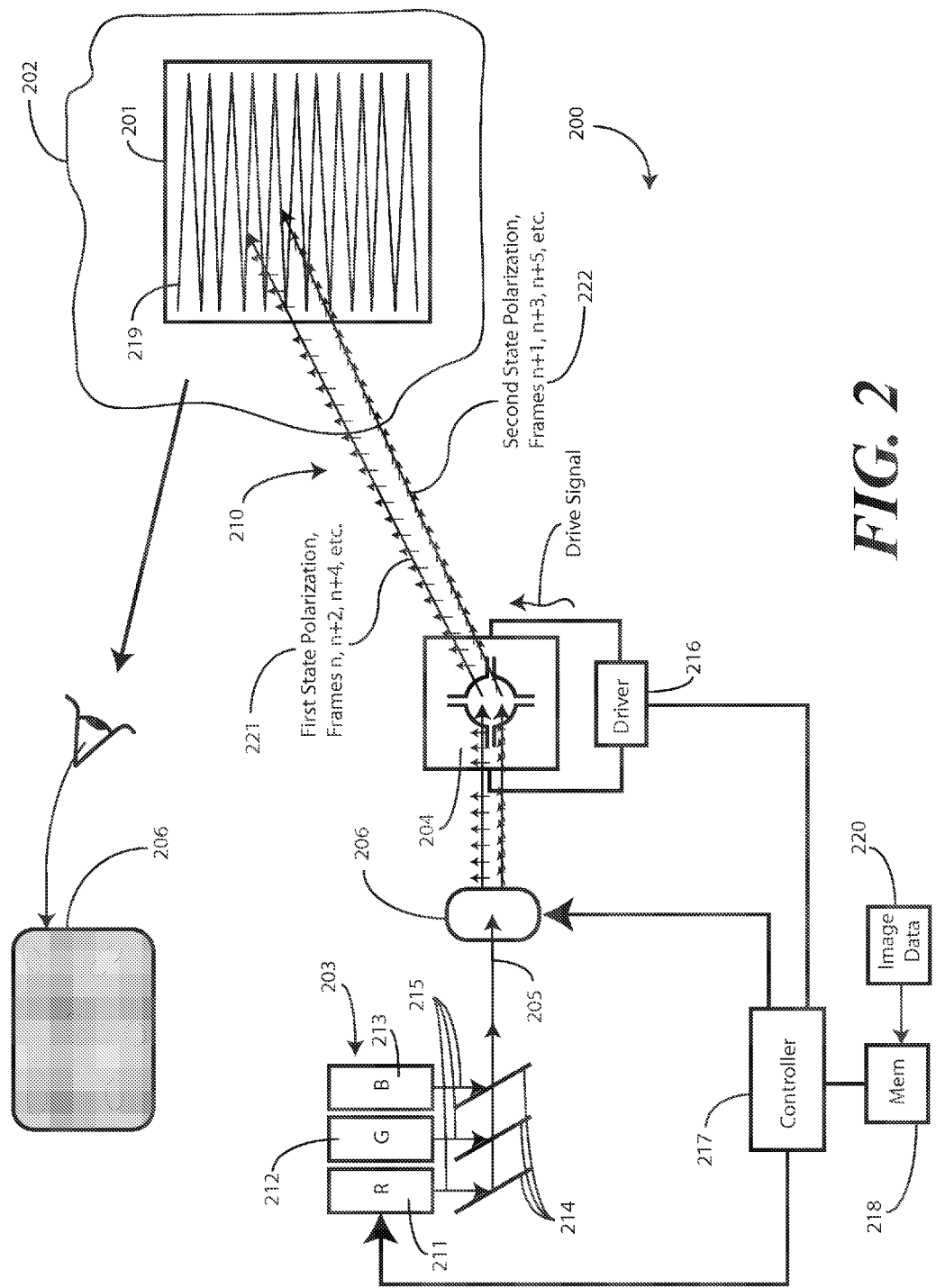
FIG. 2 illustrates one embodiment of a projection system configured in accordance with one or more embodiments of the invention.

Turning now to FIG. 2, illustrated therein is one embodiment of an imaging system 200 configured to reduce perceived speckle in images 201 produced on a projection surface 202 in accordance with embodiments of the invention. The imaging system 200 of FIG. 2 includes one or more laser sources 203, a light modulator 204, and an active polarization switch 206. The configuration of FIG. 2 is intended for illustration and to aid in understanding of embodiments of the invention. It will be clear to those of ordinary skill in the art having the benefit of this disclosure that other configurations of laser projection systems can be used in accordance with embodiments of the invention without departing from the spirit and scope of the invention.

In one embodiment, the one or more laser sources 203 comprise a red laser 211, a green laser 212, and a blue laser 213, as indicated by the "R," "G," and "B." These lasers can be various types of lasers, including semiconductor lasers such as edge-emitting lasers or vertical cavity surface emitting lasers. Such semiconductor lasers are well known in the art and are commonly available from a variety of manufacturers. The light 205 from the laser sources 203, being laser light, is polarized with a known and well defined orientation when delivered to the light modulator 204.

To facilitate freedom of design, i.e., to permit the designer to orient the one or more laser sources 203 in different ways relative to the light modulator 204, one or more optical alignment devices 214 can be used to direct light beams 215 from the laser sources 203 to the light modulator 204. The optical alignment devices 214 can also be used to orient the light beams 215 into a single light beam 205 where desired. In one embodiment, dichroic mirrors are used as the optical alignment devices 214. Dichroic mirrors are partially reflective mirrors that include dichroic filters that selectively pass light in a narrow wavelength bandwidth while reflecting others. Note that the location, as well as the number, of the optical alignment devices 214 can vary based upon application. For example, in some micro electromechanical-type scanning systems, sometimes referred to as "MEMS systems," the light beams 215 from the laser sources 203 can be modulated directly into the light modulator 204. Alternatively, some applications may not require optical alignment devices 214.

The light modulator 204 is configured to produce images 201 with light 205 from the laser sources 203 by scanning the light 205 as scanned light 210 along the projection surface 202. In one embodiment, the light modulator 204 can be a MEMS scanning mirror, such as those manufactured by Microvision, Inc. Examples of MEMS scanning mirrors, such as those suitable for use with embodiments of the present invention, are set forth in commonly assigned U.S. patent application Ser. No. 11/786,423, filed Apr. 10, 2007, entitled, "Integrated Photonics Module and Devices Using Integrated Photonics Module," which is incorporated herein by reference, and in U.S. Published patent application Ser. No. 10/984,327, filed Nov. 9, 2004, entitled "MEMS Device Having Simplified Drive," which is incorporated herein by reference. A MEMS light modulator is well suited to embodiments of the invention due to its compact construction, cost effectiveness, and reliability. While a MEMS device will be used herein for discussion purposes, it will be clear to those of ordinary skill in the art having the benefit of the disclosure that other modulator platforms may be used as well such as panel-based modulators including LCD, LCOS and DMD.

The light modulator 204 is responsive to a driver 216 and a controller 217. The controller 217 can comprise one or more processors that execute instructions stored in a corresponding memory 218. The controller 217 and driver 216, in one embodiment are configured to deliver a drive signal to the light modulator 204 based upon image data 220 stored in memory 218. The driver 216 can cause the light modulator 204 to sweep the scanned light 210 in accordance with image data 220 stored in the memory 218. In one embodiment, the light modulator 204 is configured to sweep in a raster pattern. For example, where the image data 220 is video content, each raster scan of the raster pattern can comprise a frame of video. Where the image data 220 is a still image, each raster scan of the raster pattern may refresh the image by redrawing it.

In one embodiment, the driver 216 is operative to pivot the light modulator 204 about a first axis and second axis by delivering a control signal to the light modulator 204. This pivoting action causes the scanned light 210 to move horizontally and vertically to form an image. In one embodiment, the pivoting occurs in accordance with a raster pattern 219. The control signal may cause the light modulator 204 to sweep the scanned light 210 horizontally at a relatively higher frequency, and also vertically using relatively lower frequency components, thereby creating the raster pattern 219. The raster pattern 219 is refreshed at an image refresh cycle. Common refresh cycles are 60 Hz and 100 Hz. When using a 60 Hz refresh cycle, for example, the image 201 will be redrawn sixty times per second.

The active polarization switch 206, examples of which will be described in more detail below, is disposed in this illustrative embodiment along an optical path defined between the laser sources 203 and the light modulator 204. While this is one illustrative embodiment, the active polarization switch 206 could alternatively be placed in an optical path of the scanned light 210, i.e., between the light modulator 204 and the projection surface 202. Placing the active polarization switch 206 before the light modulator 204 works well in many applications because the pre-scanned laser beam is very well defined and highly polarized. However, experimental testing has shown it can be placed after the light modulator 204 as well.

The active polarization switch 206 is a device that is configured to, either electrically, mechanically, or by combinations thereof, alter a polarization orientation of light between image refresh sweeps. The light altered can vary based upon placement of the active polarization switch 206. In one embodiment, when the active polarization switch 206 is placed between the light modulator 204 and the laser sources 203, the light will be the pre-scanned beam, e.g., light 205.

In another embodiment, when the active polarization switch 206 is placed after the light modulator 204, the light will be the scanned light 210.

In one embodiment, the active polarization switch 206 is configured to alternate a polarization orientation of light 205 or scanned light 210 in synchrony with an image refresh cycle of the imaging system 200. Said differently, between each sweep of the image, the active polarization switch 206 changes the polarization orientation of received light, thereby "un-correlating" light causing speckle patterns and, accordingly, reducing speckle. For example, when the light modulator 204 is generating a raster pattern 219, the active polarization switch 206 may be configured to change the orientation of its optical axis during a flyback period of the raster pattern 219.

In FIG. 2, the scanned light 210 is illustratively shown as a first scanned beam 221 and a second scanned beam 222. The first scanned beam 221 and second scanned bean 222 refresh the image 201 on alternating sweeps. For example, at sweep n, n+2, n+4, etc., the first scanned beam 221 refreshes the image 201. At sweeps n+1, n+3, n+5, etc., the second scanned beam 222 refreshes the image 201. The difference between the first scanned beam 221 and the second scanned beam 222 is the polarization orientation. The active polarization switch 206 causes the first scanned beam 221 to have a polarization orientation that is rotated about ninety degrees from the polarization orientation of the second scanned beam 222. (The terms "about" and "substantively" are used herein to refer to orientations inclusive of manufacturing and design tolerances.) Accordingly, the first scanned beam 221 is shown illustratively as having a vertical polarization, while the second scanned beam 222 is shown as having a horizontal polarization. Accordingly, the active polarization switch 206 introduces polarization diversity between refresh sweeps of the image 201.

It should be noted that the various polarization orientations of the system need not be linear, e.g., aligned vertically and horizontally. Other polarization orientations can equally be modified. For instance, circular and elliptical polarizations can also be modified by the active polarization switch 206 to introduce polarization diversity. It should also be noted that the system need not be a "scanned" laser system. The active polarization switch 206 can be used in other laser projection systems as well. For example, a laser illuminated panel based projector (DLP or LCOS) projector can use this technique as well by placing the active polarization switch 206 after the output. Speckle is still reduced because the output beam is going to have a known polarization state. Accordingly, the active polarization switch 206 would work in a similar fashion in those applications.

Figure 3:
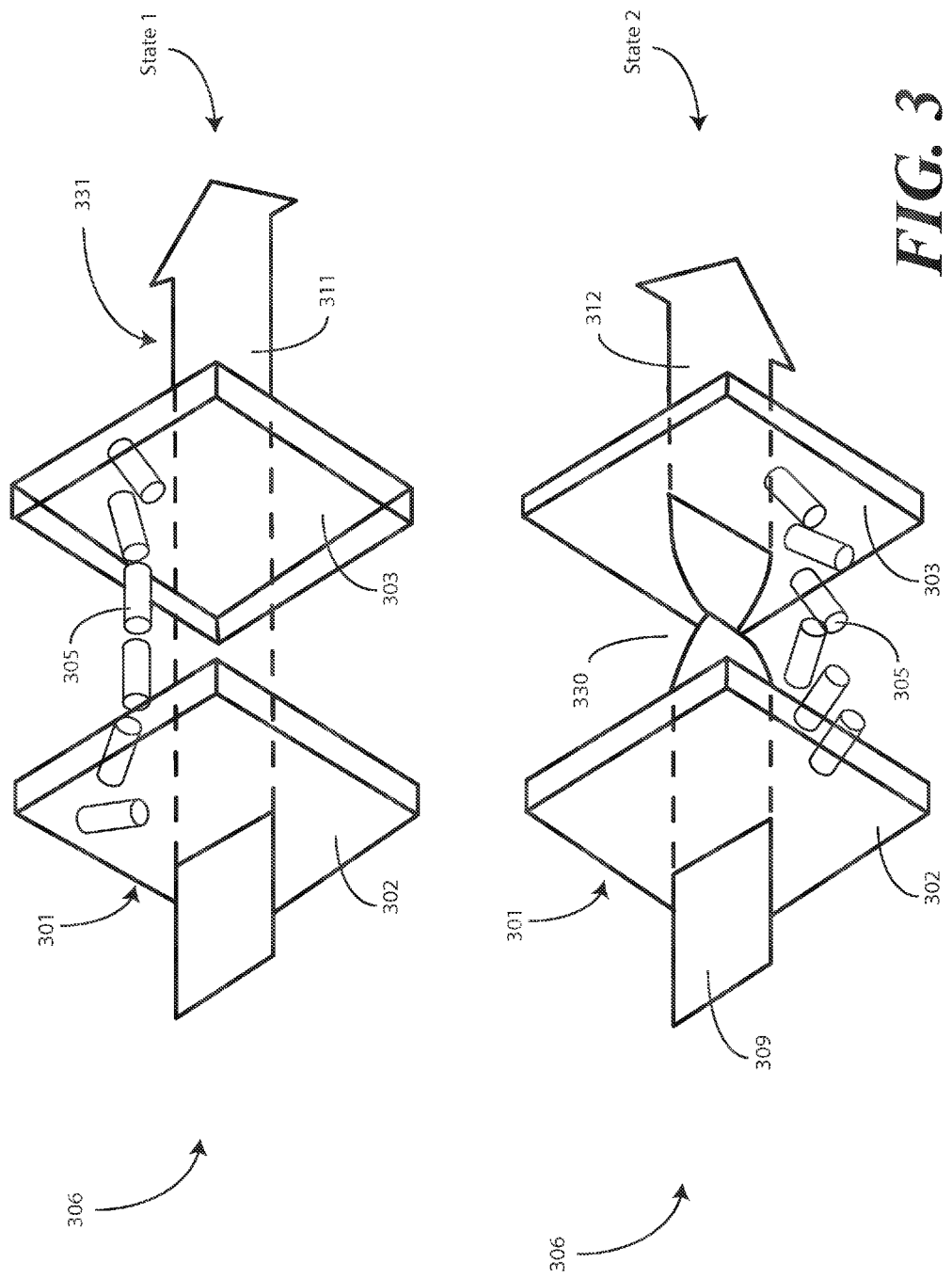
FIG. 3 illustrates one embodiment of an active polarization switch suitable for use with one or more embodiments of the invention.

The active polarization switch 206 can take multiple forms. For instance, in one embodiment, the active polarization switch comprises a twisted nematic liquid crystal device. Turning now to FIG. 3, illustrated therein is one such device.

The active polarization switch 306 of FIG. 3 is manufactured using a twisted nematic liquid crystal material 301. While a twisted nematic liquid crystal material 301 is one illustrative material suitable for use in the active polarization switch 306 of FIG. 3, it will be clear to those of ordinary skill in the art having the benefit of this disclosure that other similar materials, such as polymer-dispersed liquid crystal material, super twisted nematic liquid crystal material, electrically-controlled birefringent material, optically-compensated bend mode material, guest-host materials, and other types of light modulating materials may equally be used.

The twisted nematic liquid crystal material 301 is disposed between two substrates 302,303 having electrodes disposed thereon. In the illustrative embodiment of FIG. 3, both the electrodes and substrates 302,303 are transparent. For example, the substrates 302,303 may be manufactured from plastic or glass, with the electrodes being deposited as indium-tin oxide affixed to each substrate 302,303. The electrodes can then be coupled to a variable voltage source (not shown) that is responsive to a controller. The controller causes the variable voltage source to apply a field to one substrate 302, while the other substrate 303 acts as a ground. (Note that the direction of the electric field is not important. Accordingly, either electrode can be coupled to the variable voltage source or can act as the ground.)

The electric field applied alters the light transmission properties of the twisted nematic liquid crystal material 301 by causing rotation of rod-like mesogens 305 forming the liquid crystal material. The mesogens 305 each function as an oriented optical element. When no electric field is applied between the substrates 302,303, the mesogens 305 rotate from one substrate 302 to the other substrate 303, thereby causing the polarization of an input beam 309 to rotate 330. When an electric field is applied between the substrates 302, 303, such as a voltage of five volts, the input beam 309 passes through 331 without rotation.

In one embodiment of the present invention, during a first refresh sweep of an image, a first voltage is be applied across the substrates 302,303 to the twisted nematic liquid crystal material 301. Accordingly, the output beam 311 will have substantially the same polarization orientation as the input beam 309.

Once this sweep is completed, before a successively subsequent sweep begins, a second voltage, which may be zero volts, can be applied to the substrates 302,303 that causes the polarization orientation of the output beam 312 to rotate by about ninety degrees relative to the output beam 311 previously used to create the image. This subsequent output beam 312 can be used to create an image during the subsequent sweep. As the process is repeated, alternating the polarization orientation by about ninety degrees from sweep to sweep introduces polarization diversity and reduces perceived speckle.

While twisted nematic liquid crystal material 301 works well in practice, one issue that can plague its performance is the switching speed. For example, some twisted liquid crystal materials switch at relatively slow rates compared to the refresh rates used in projection systems. As noted above, in many projection applications, images are frequently projected at a rate of 60 Hz or 100 Hz, which means that the image is scanned or swept 60 times per second. In these applications, to reduce speckle, the active polarization switch 306 has to "totally switch" to an orthogonal optical orientation after one frame ends and before another frame starts. While some twisted nematic liquid crystal materials are capable of achieving the necessary switching rates, others are not.

Figure 4:
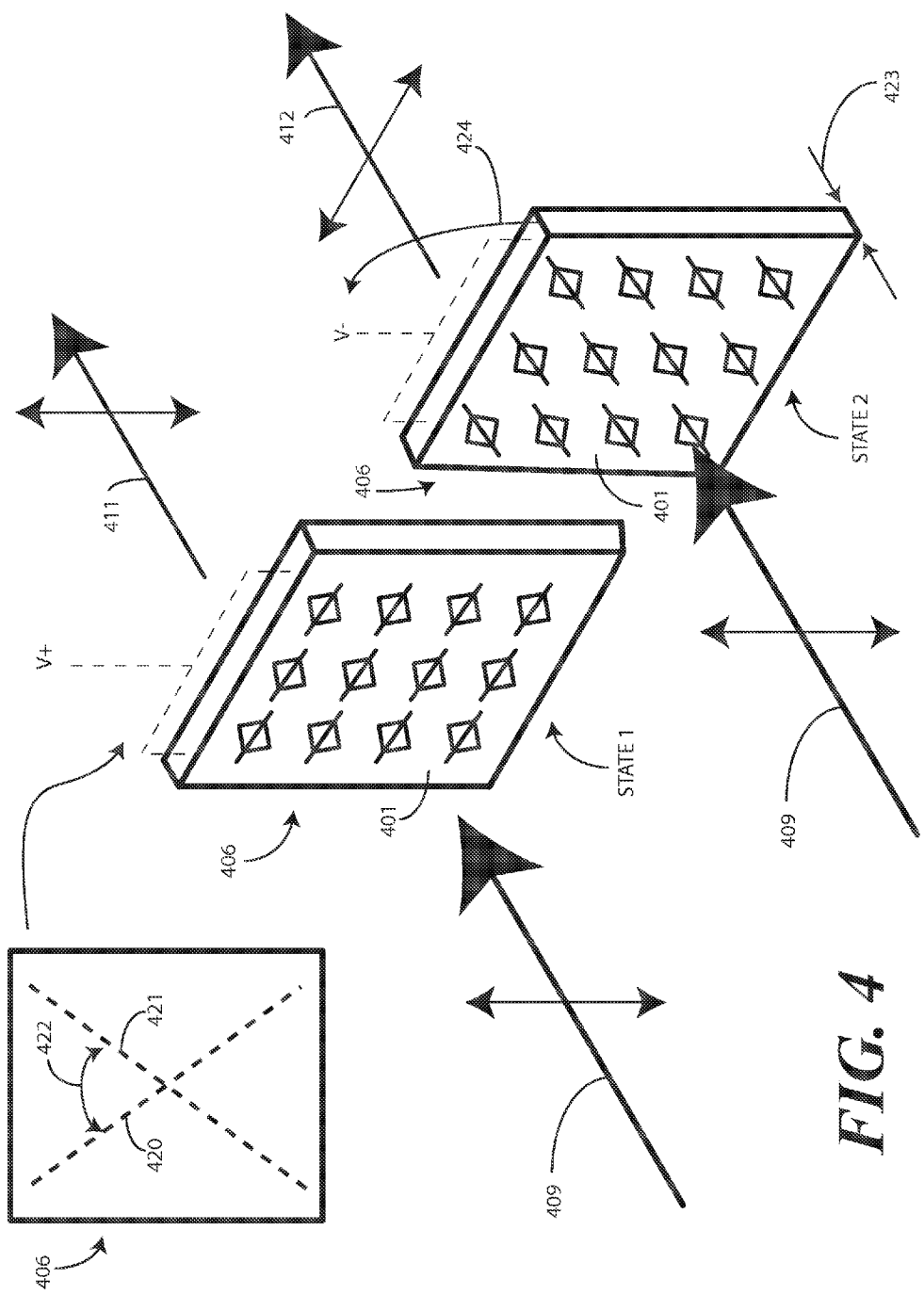
FIG. 4 illustrates another embodiment of an active polarization switch suitable for use with one or more embodiments of the invention.

With this in mind, turning now to FIG. 4, illustrated therein is a second example of an active polarization switch 406 suitable for use with one or more embodiments of the invention. The active polarization switch 406 of FIG. 4 is a ferroelectric liquid crystal device (FLCD). The construction is similar to that shown in FIG. 3, with electrodes disposed on substrates (not shown), which are coupled to a variable voltage source (not shown) and ground, as described above. (The common elements with FIG. 3 are not shown in FIG. 4.) However, rather than using a twisted nematic liquid crystal material, the active polarization switch 406 of FIG. 4 employs ferroelectric liquid crystal material 401. This material generally is able to switch much faster than is twisted nematic material. Accordingly, it can provide superior performance in projection applications.

While they can be manufactured in a variety of configurations, most standard ferroelectric liquid crystal devices are configured as "bistable" devices, which means that through the design of the mesogens, the device has particular bistable orientations of the optical axis. For example, in FIG. 4, two optical axis orientations 420,421 are shown. These optical axis orientations 420,421 are separated by a tilt angle 422, which is a product of the design. Each optical axis orientation 420,421 represents a mesogen alignment to which the mesogens orient in the presence of an applied voltage.

The ferroelectric device is configured to operate as birefringent media in accordance with embodiments of the invention. This means that the index of refraction depends on the polarization and propagation direction of the light with respect to the optical axis of the mesogens. The optical axis is defined as the direction corresponding to the ordinary index of refraction of the liquid crystal molecule. In other words, as the orientation of the liquid crystal molecules is changed under applied voltage, the optical axis of the device rotates. In the ferroelectric device of FIG. 4, this means that the mesogens rotate by the tilt angle 422. Where the tilt angle 422 is about forty-five degrees, and the thickness 423 of the ferroelectric device is configured to be a half-wave retarder for a particular wavelength, the polarization orientation output states of incident light at the particular wavelength will be rotated by about ninety degrees.

While twisted nematic and ferroelectric devices are two illustrative active polarization switches, it will be clear to those of ordinary skill in the art having the benefit of this disclosure that embodiments of the invention are not so limited. For example, mechanical polarizers, e.g., a fixed halfwave plate that gets twisted between two orientations, can be substituted for the ferroelectric or twisted nematic devices described above. Additionally, a faraday rotator that is configured to give two orthogonal output polarization states can be used as well.

In one embodiment, the ferroelectric device is optimized for a particular wavelength or color. For instance, the ferroelectric device can be configured to have a tilt angle 422 of about forty-five degrees. The ferroelectric device can further be configured to have a thickness 423 that causes the device to act as a half-wave retarder for the particular wavelength. For linearly polarized light (laser light tends naturally to be highly polarized and well defined), this configuration will cause light of the particular wavelength to be output on polarization orientation states that are substantially twice the tilt angle 422, or about ninety degrees. Moreover, this output will result regardless of the "clocking angle" of the active polarization switch 406, which is the axially rotated 424 alignment relative to the incident beam 409. Thus, regardless of axially rotated 424 alignment of the active polarization switch 406, an incident beam 409 of the target wavelength that is vertically polarized will be substantially transmitted as a linearly polarized output beam 411 when the active polarization switch 406 is in a first state. Similarly, and again regardless of the axially rotated 424 alignment of the active polarization switch 406, an incident beam 409 that is vertically polarized will be substantially transmitted as a linearly polarized output beam 412, that is orthogonal to the polarization state of the first state when the active polarization switch 406 is in the second state. In one embodiment, the two states are obtained by applying oppositely polarized voltages to the electrodes disposed about the ferroelectric liquid crystal material 401.

Figure 5:
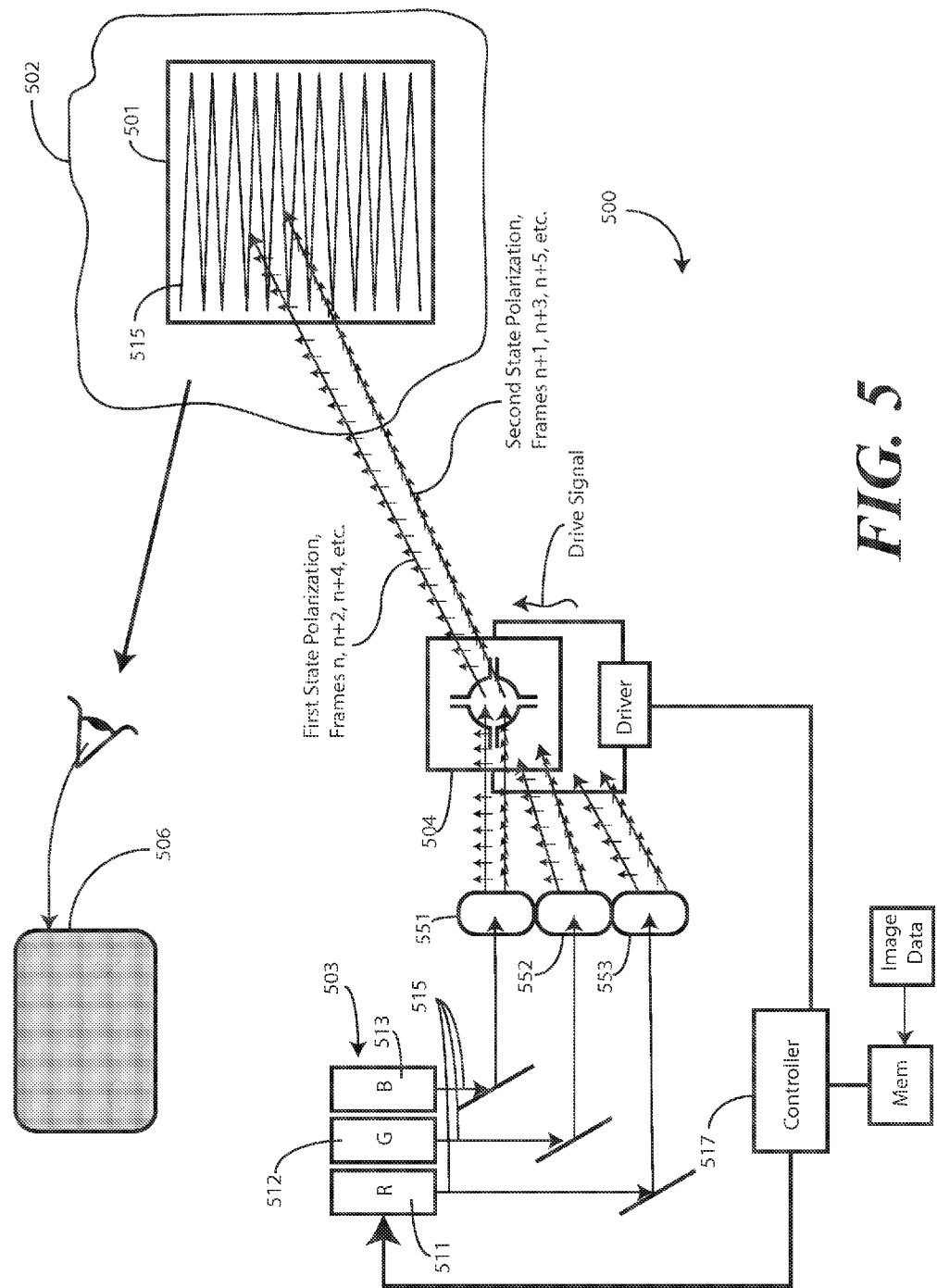
FIG. 5 illustrates another embodiment of a projection system configured in accordance with one or more embodiments of the invention.

Turning now to FIG. 5, illustrated therein is a laser scanning image system 500 configured for reduced speckle in accordance with one or more embodiments of the invention. As with the imaging system (200) of FIG. 2, the laser scanning imaging system 500 of FIG. 5 includes one or more laser light sources 503. The laser light sources 503 are configured as a red laser source 511 having a center wavelength of about 650 nanometers, a green laser source 512 having a center wavelength of about 530 nanometers, and a blue laser source 513 having a wavelength of about 450 nanometers.

Light from the laser light sources 503 is delivered to a light modulator 504, which is an electromechanically controllable scanning assembly in this illustrative embodiment. The light modulator 504 receives light from the laser light sources 503 and pivots about a first axis and a second axis in response to a drive signal from a controller 517 to form images 501 by scanning a projection surface 502 in a sweep pattern 515. In one embodiment, the sweep pattern 515 comprises a raster pattern.

Three active polarization switches 551,552,553 are disposed between the laser light sources 503 and the light modulator 504. While the active polarization switches 551,552,553 can be mechanical, twisted nematic, ferroelectric, or other devices, in this illustrative embodiment each is configured as a bistable ferroelectric liquid crystal device having a tilt angle of about forty-five degrees. Further, in this embodiment each active polarization switch 551,552,553 has a thickness optimized for the color or wavelength of light incident upon it. For example, active polarization switch 553 is configured with a thickness that functions as a half wave plate for red light when in one of the two bistable states. Similarly, active polarization switches 552,551 are configured with thicknesses that function as a half wave plate for green and blue light, respectively, when in one of the two bistable states. Accordingly, each active polarization switch 551,552,553 is configured to alter a polarization orientation substantially orthogonally of its color of light between sweeps of the raster pattern to perceived speckle 506.

Figure 6:
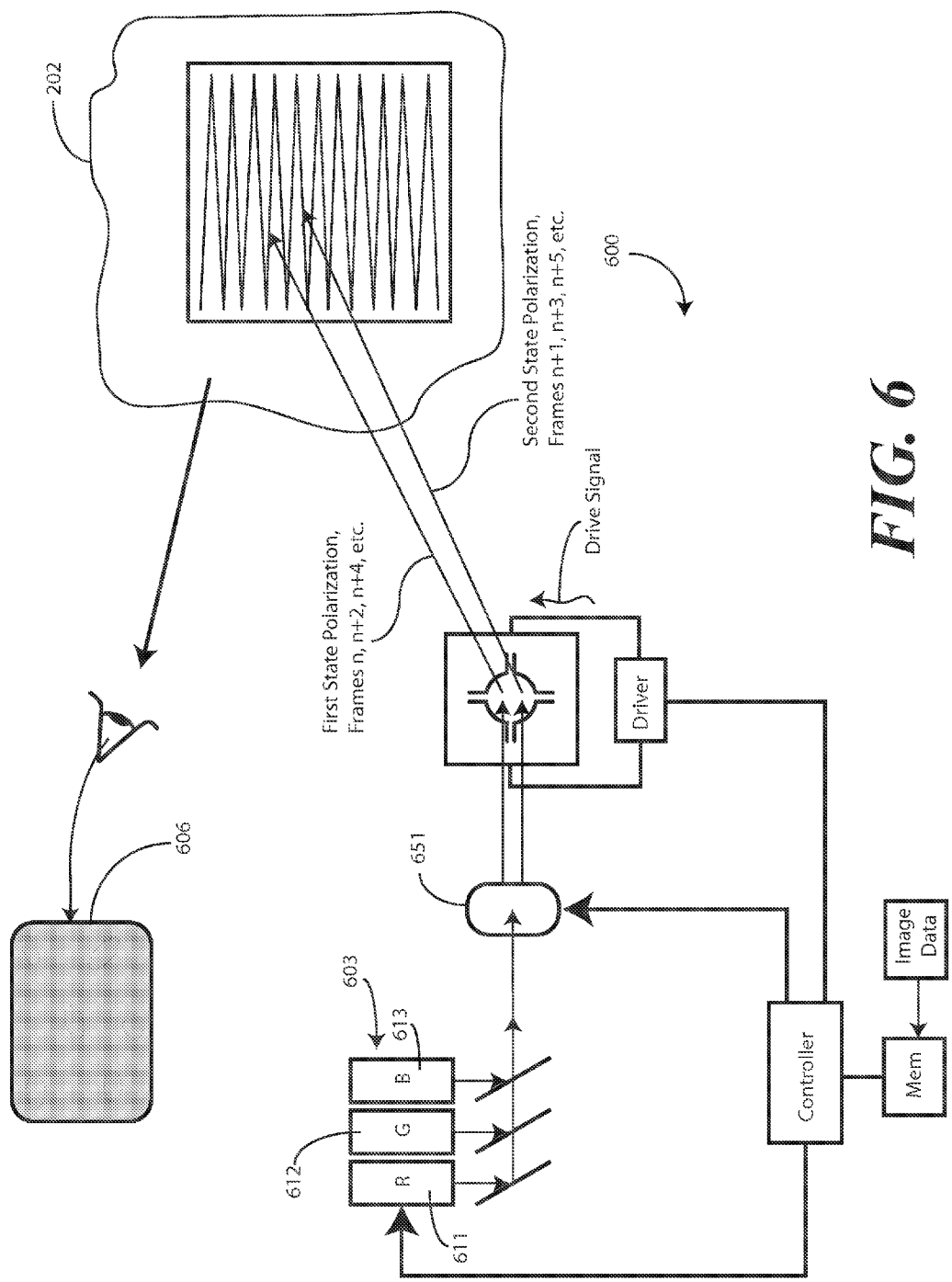
FIG. 6 illustrates another embodiment of a projection system configured in accordance with one or more embodiments of the invention.

While the laser scanning image system 500 of FIG. 5 works well in practice, its principle drawback is that it requires three active polarization switches 551,552,553, each optimized for its particular wavelength of light. Turning now to FIG. 6, illustrated therein is another laser system 600 that uses only a single active polarization switch 651. The use of a single active polarization switch 651 still reduces speckle, but also saves cost and part count as well. In FIG. 6, the active polarization switch 651 is configured as a bistable ferroelectric liquid crystal device.

In the illustrative embodiment of FIG. 6, the active polarization switch 651 is optimized for one wavelength of the three wavelengths emitted by the laser sources 603. In this illustrative embodiment, the active polarization switch 651 has been optimized for the green laser source 612 by having a forty-five degree tilt angle and a thickness that works as a half wave plate for green light. While the active polarization switch 651 could have been optimized for the red laser source 611 or the blue laser source 613, green has been selected for this embodiment for a few reasons: First, green is the central wavelength in this red-green-blue system. Second, photopically speaking, testing has shown that green is responsible for about seventy percent of the human eye's response.

Figure 7:
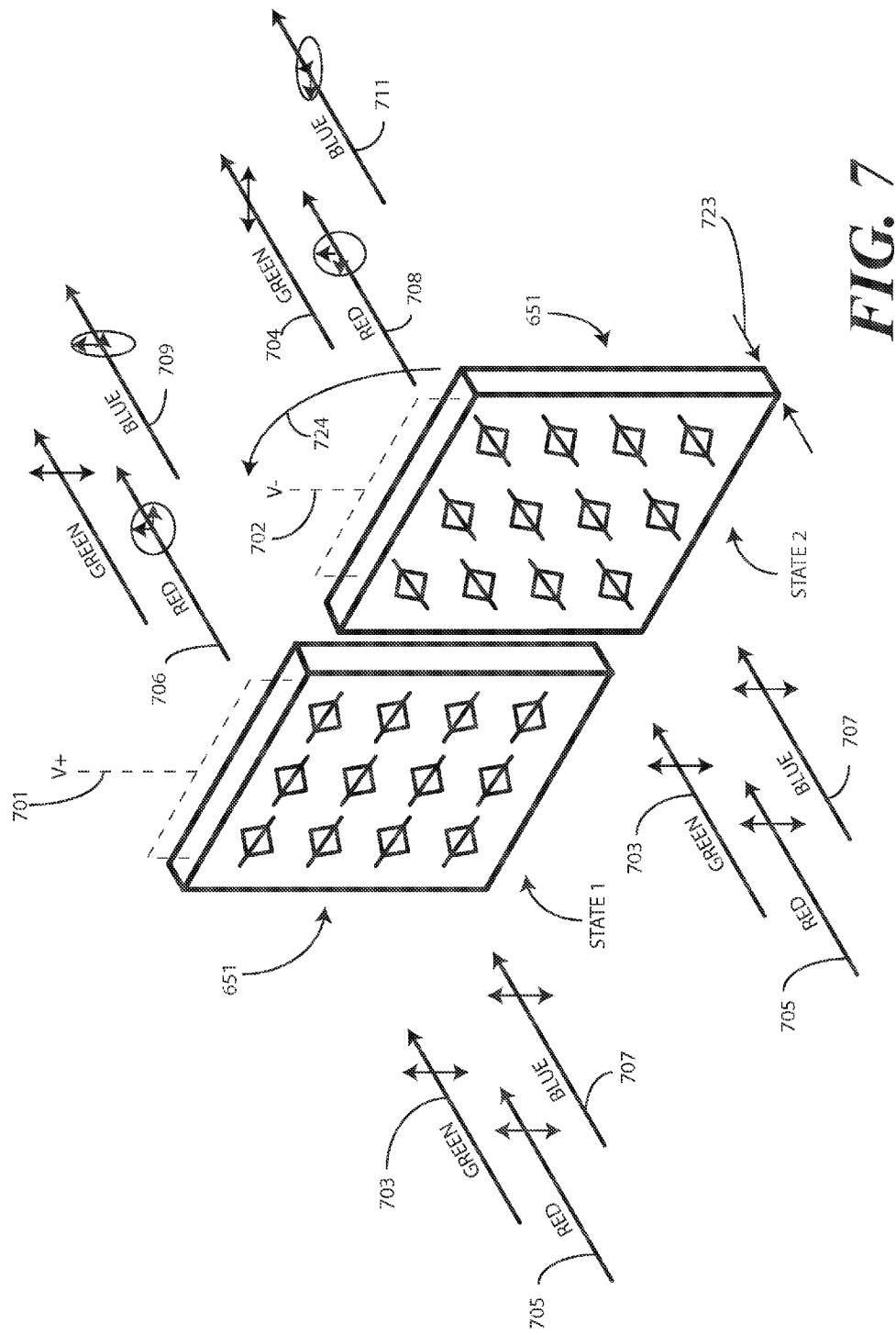
FIG. 7 illustrates examples of bistable states of an active polarization switch suitable for use with one or more embodiments of the invention.

With reference now to FIGS. 6 and 7, as the active polarization switch 651 has been tuned to green. Accordingly, the "optical path" looks, to green light seeing the extraordinary axis of refraction, like it is about 265 nanometers longer due to the thickness 723 and molecular construction of the ferroelectric material that it does to green light seeing the ordinary axis of refraction. The axes of the active polarization switch 651 then "switch" by the tilt angle when the active polarization switch changes from a first state 701 to a second state 702. Where neither axis of the active polarization switch 651 is aligned with the polarization of the input light, the input light will be composed of portions that see the ordinary axis and portions that see the extraordinary axis. However, due to the longer effective path length, light passing along the extraordinary axis will be rotated by 180 degrees relative to the light polarized along the ordinary axis. Thus, when in a first state 701, polarized green light 703 passes through with a first output state defined by the active polarization switch 651. When in a second state 702, polarized green light 703 passes through with a second output state that is rotated by twice the angle between the input polarization and the ordinary axis. Said differently, when in the second state, the polarization orientation of incident green light 703 is rotated by an amount twice the tilt angle, which in this case is ninety degrees, relative to its orientation in the first state, resulting in orthogonally polarized green output light 704.

For red light 705 from the red laser source 611 and blue light 707 from the blue laser source 613, the active polarization switch 651 is not particularly optimized. For the red light 705, the optical path length difference between the extraordinary axis and ordinary axis is shorter than a half wave. For blue light 707, it is longer than a half wave. Presuming for this example that the output of the red laser source 611, the green laser source 612, and the blue laser source 613 is all polarized with the same orientation, the active polarization switch 651 will have different effects on different wavelengths.

In this illustrative example, the active polarization switch 651 is optimized for green, and thus has a half-wave retardation between the ordinary and extraordinary axes. The active polarization switch 651 also has a tilt angle of forty-five degrees. When the bistable optical axis is switching by the tilt angle of forty-five degrees, the two output states will have polarization orientations that are rotated by ninety degrees. This is true regardless of the polarization orientation of the incident green light 703. Said differently, regardless of whether the polarization orientation of the incident green light 703 is aligned with, or misaligned with, the ordinary and extraordinary axes, the two output states will be ninety degrees apart because the active polarization switch 651 is configured as a half wave retarder for green light with a tilt angle of forty-five degrees.

Illustrating by example, if the input polarization orientation of the green light is exactly aligned with an optical axis of one state of the active polarization switch 651, there would be no polarization rotation whatsoever in the first state, and a rotation of about ninety degrees in the other state. Similarly, if the polarization orientation of the green light were not aligned with an optical axis of the active polarization switch 651, e.g., five degrees out of alignment, the input light is going to be rotated by about ten degrees in one state, and moved one hundred degrees in the other state. Again, the difference between the two states is about ninety degrees. Accordingly, for green light, when the active polarization switch 651 is optimized for that color, the axial orientation or "clocking angle" of the active polarization switch 651 with respect to the polarization orientation of incident green light does not matter. Regardless of axial orientation, output green light will always have about ninety degrees of rotation between the two bistable states.

For red light 705 from the red laser source 611 and blue light 707 the blue laser source 613, the active polarization switch 651 is not optimized Accordingly, the active polarization switch 651 does not act as a half wave plate. For incident red light 705, the optical path length difference between the extraordinary axis and the ordinary axis looks less than a half wave plate. For blue light 707, the optical path length difference looks longer than in a half wave plate. Linearly polarized red and blue light incident upon the active polarization switch 651 are therefore output as light 706,708,709,711 with an elliptical polarization because the ordinary and extraordinary components are not traveling together. Thus, only a portion of red light and blue light is rotated by an active polarization switch 651 optimized for green, rather than substantially all of the red and blue light as was the case in FIG. 5. The resultant speckle reduction 606 is thus less than that shown in FIG. 5, but still substantially better than the prior art shown in FIG. 1. Additionally, part count is saved and cost is reduced in the system 600 of FIG. 6 as compared to the laser scanning image system (500) of FIG. 5.

Experimental testing has shown that despite having lesser speckle reduction than the laser scanning image system (500) of FIG. 5, the speckle reduction 606 of the system 600 of FIG. 6 can be maximized by changing the clocking angle 724 of the active polarization switch 651. Recall from above that the clocking angle refers to the axially rotated alignment of the active polarization switch 651 relative to the incident beam. Since green light is unaffected by clocking angle in this illustrative embodiment, the active polarization switch 651 can be "clocked" so that the difference in the elliptical polarizations of the red and blue light has its "orthogonality" difference maximized between the two bistable states. Said differently, there is a clocking angle that maximizes the orthogonality of the two output states, and this provides optimum speckle reduction from a "green optimized" active polarization switch 651 for red and blue light.

Figure 8:
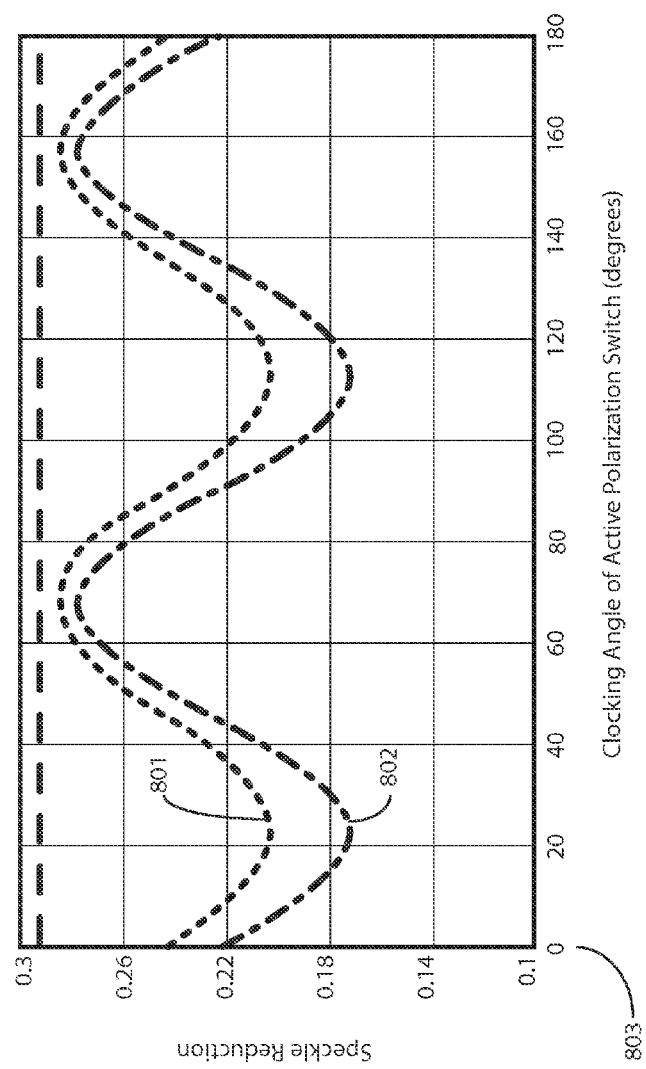
FIG. 8 illustrates speckle reduction achieved when using the active polarization switch of FIG. 7.

Turning now to FIG. 8, illustrated therein is a plot of speckle reduction versus clocking angle (724) for the active polarization switch (651) of FIG. 6. A plot 801 of the speckle reduction due to red light versus clocking angle and a plot 802 of the speckle reduction due to blue light versus clocking angle is shown. As can be seen, for a zero degree clocking angle 803, where the polarization orientation of incident light is parallel to one of the optical axes of the active polarization switch (651), the speckle reduction is not optimal for red and blue. It is only between twenty-two percent and twenty-six percent. However, when the active polarization switch (651) is clocked by about 67.5 degrees, speckle reduction for both red light and blue light is greater than twenty-six percent. This results in one optical axis of the active polarization switch (651) being axially oriented about 67.5 degrees from the polarization orientation of the incident light, and the other optical axis being oriented at about 157.5 degrees from the polarization orientation of the incident light. Accordingly, the speckle reduction afforded by the system (600) of FIG. 6 can noticeably be improved by clocking the active polarization switch (651).

Figure 9:
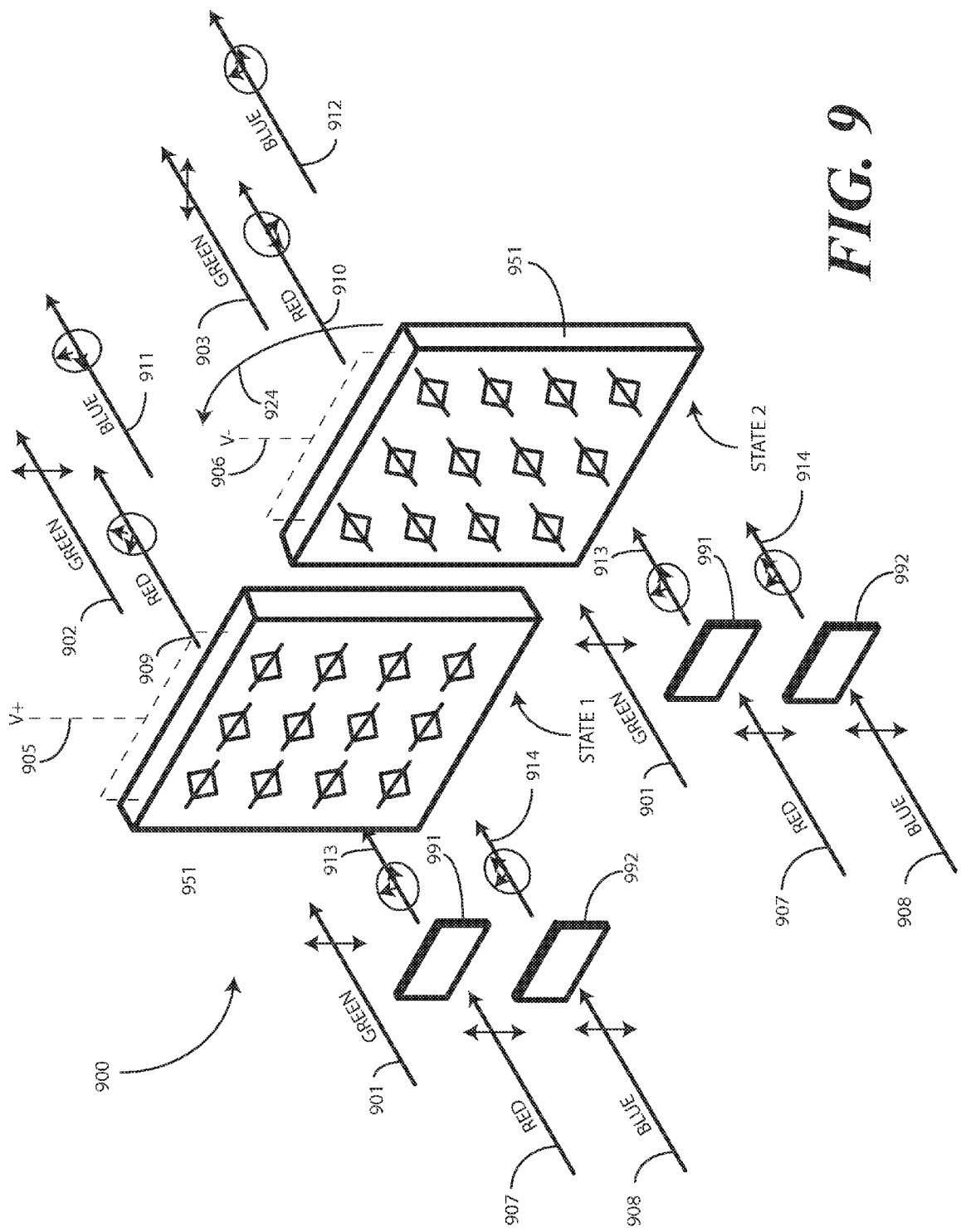
FIG. 9 illustrates on bistable active polarization switch combined with light preconditioners suitable for use in one or more embodiments of the invention.

In yet another embodiment of the invention, the speckle reduction provided by system (600) of FIG. 6 can be further improved by preconditioning light for which the active polarization switch is not optimized Turning now to FIG. 9, illustrated therein is an assembly 900 configured to do just that.

The assembly 900 of FIG. 9, which can be substituted for the active polarization switch (651) of FIG. 6, includes an active polarization switch 951 and two incident light preconditioners 991,992. In this illustrative example, the active polarization switch 951 is configured as a bistable ferroelectric liquid crystal device, and is further optimized for green light 901, as was the active polarization switch (651) of FIG. 6. Thus, output green light 902,903 has a polarization orientation with ninety degrees difference between the first state 905 and second state 906 of the active polarization switch 951. This is true regardless of clocking angle 924.

Recall from above that as the active polarization switch 951 is not optimized for red light 907 or blue light 908, the output red light 909,910 and output blue light 911,912 is elliptically polarized. Experimental testing has shown that when the incident blue and green input light conditioned by being elliptically polarized before reaching the active polarization switch 951, two things occur: First, more speckle reduction can be achieved. Second, the clocking angle 924 of the active polarization switch 951 for optimal speckle reduction becomes relatively relaxed.

To precondition the input red light 907 and input blue light 908, in one embodiment quarter wave plates for each central wavelength are used as the light preconditioners 991,992. When passing through the quarter wave plates, the input red light 907 becomes elliptically polarized input red light 913. Similarly, the input blue light 908 becomes elliptically polarized input blue light 914. (Note that two light preconditioners 991,992 are not required. One or the other could be used to reduce part count and cost.) The use of elliptically polarized red and blue input light allows the "tolerance band" of the optimum speckle reduction clocking angle 924 to be significantly increased. This allows fairly general placement of the light preconditioners 991,992 without having to maintain tight manufacturing tolerances. Reduced tolerances mean reduced cost.

Figure 10:
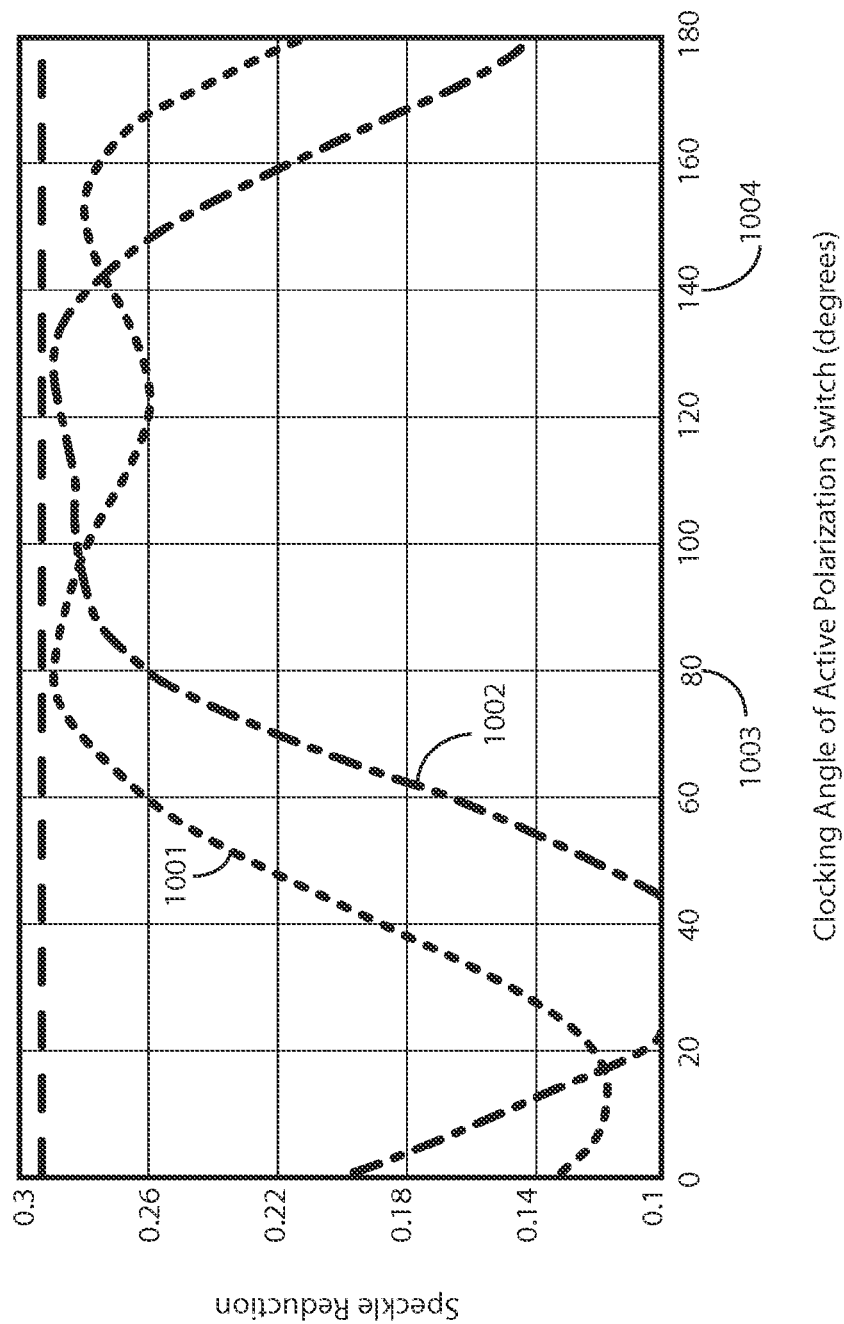
FIG. 10 illustrates speckle reduction achieved when using the active polarization switch of FIG. 9.

Turning now to FIG. 10, illustrated therein is a plot of speckle reduction versus clocking angle (724) for the assembly (900) of FIG. 9 when substituted for the active polarization switch (651) in the system (600) of FIG. 6. A plot 1001 of the speckle reduction due to red light versus clocking angle and a plot 1002 of the speckle reduction due to blue light versus clocking angle is shown. In both cases, light preconditioners (991,992) are used to elliptically polarize the red and blue light.

As can be seen, the speckle reduction for both red and blue light is above twenty-six percent for clocking angles for a wide range of angles 1003,1004. In this graph, speckle reduction is above twenty-six percent between about eighty degrees and 140 degrees. Thus, at the additional cost of adding two quarter wave plates, alignment tolerances can be greatly relaxed.

As described above, five different embodiments of laser systems have been illustrated and described, each offering greatly reduced speckle when compared to prior art systems. A first uses three active polarization switches disposed between three laser sources and a light modulator. The active polarization switches, which may be twisted nematic liquid crystal devices, mechanical devices, ferroelectric liquid crystal devices, or other devices, may optionally be optimized for a particular color of incident light. The active polarization switches are configured to alter a polarization orientation of incident light between refresh sweeps of an image.

In a second embodiment, a single active polarization switch is used. While the single active polarization switch can be a twisted nematic liquid crystal device, mechanical devices, or other device, in one embodiment it is configured as ferroelectric liquid crystal device that is optimized for a desired wavelength. In one embodiment, this wavelength is green. The active polarization switch is configured to alter a polarization orientation of green light by ninety degrees between refresh sweeps, and to partially rotate the polarization orientation of red light and blue light as well to reduce perceived speckle. In a third embodiment, the single active polarization switch is clocked to optimize speckle reduction caused by the blue and red light.

In a fourth embodiment, a single active polarization switch is used. While the single active polarization switch can be a twisted nematic liquid crystal device, mechanical devices, or other device, in one embodiment it is configured as ferroelectric liquid crystal device that is optimized for a desired wavelength. In one embodiment, this wavelength is green. In addition to the active polarization switch, one or more light preconditioners are used with other wavelengths. For example, a red quarter wave plate can be used with red light and a blue quarter wave plate can be used with blue light. The light preconditioners convert incident light into elliptically polarized light. The active polarization switch is configured to alter a polarization orientation of green light by ninety degrees between refresh sweeps, and to rotate the elliptical polarization orientations of red light and blue light as well to reduce perceived speckle. In a fifth embodiment, the single active polarization switch is clocked to optimize speckle reduction caused by the elliptically polarized blue and red light.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An imaging system configured to reduce perceived speckle in images produced by the imaging system, the imaging system comprising:
   one or more laser sources;
   a light modulator configured to produce the images with light from the one or more laser sources by modulating the light along a projection surface; and
   one or more active polarization switches disposed in an optical path of the imaging system and configured to alternate a polarization orientation of the light in synchrony with an image refresh cycle of the imaging system, wherein the one or more laser sources comprise three laser sources, and the one or more active polarization switches comprises a single ferroelectric device, wherein the single ferroelectric device is electronically switchable between a first state having a first optical axis orientation and a second state having a second optical axis orientation separated by a tilt angle of about forty-five degrees, wherein a thickness of the single ferroelectric liquid crystal device is configured to function as a half wave plate for one of the three laser sources, wherein the three laser sources comprise a red laser source, a blue laser source, and a green laser source, wherein a thickness of the ferroelectric liquid crystal device functions as a half wave plate for green light; and
   one or more quarter wave plates disposed between one or more of the red laser source or the blue laser source and the single ferroelectric liquid crystal device.

2. An imaging system configured to reduce perceived speckle in images produced by the imaging system comprising:
   one or more laser sources;
   a light modulator configured to produce the images with light from the one or more laser sources by modulating the light along a projection surface; and
   one or more active polarization switches disposed in an optical path of the imaging system and configured to alternate a polarization orientation of the light in synchrony with an image refresh cycle of the imaging system, wherein the one or more laser sources comprise three laser sources, and the one or more active polarization switches comprises a single ferroelectric device, wherein the single ferroelectric device is electronically switchable between a first state having a first optical axis orientation and a second state having a second optical axis orientation separated by a tilt angle of about forty-five degrees, wherein a thickness of the single ferroelectric liquid crystal device is configured to function as a half wave plate for one of the three laser sources, wherein the green light is linearly polarized along an axis, wherein the single ferroelectric liquid crystal device is clocked relative to the axis and wherein the single ferroelectric liquid crystal device is clocked between 80 and 140 degrees relative to the axis.

3. A laser scanning image system, comprising:
   one or more laser light sources; and
   an electromechanically controllable scanning assembly configured to receive light from the one or more laser light sources and to pivot about a first axis and a second axis in response to a drive signal to scan the light in substantially a raster pattern; and
   an active polarization switch to alter a polarization orientation of at least some of the light between sweeps of the raster pattern, thereby reducing perceived speckle, wherein the active polarization switch is configured to alter the polarization of at least one wavelength of the light substantially orthogonally between sweeps of the raster pattern, wherein the at least one wavelength corresponds to green light, and wherein the one or more laser light sources comprise a green laser, a red laser, and a blue laser, further comprising one of a blue quarter wave plate disposed between the blue laser and the active polarization switch, a red quarter wave plate disposed between the red laser and the active polarization switch, or combinations thereof.

4. A laser scanning image system, comprising:
   one or more laser light sources; and
   an electromechanically controllable scanning assembly configured to receive light from the one or more laser light sources and to pivot about a first axis and a second axis in response to a drive signal to scan the light in substantially a raster pattern; and
   an active polarization switch to alter a polarization orientation of at least some of the light between sweeps of the raster pattern, thereby reducing perceived speckle, wherein the active polarization switch comprises a ferroelectric liquid crystal device disposed in a clocked orientation relative to the polarization orientation, and wherein the ferroelectric liquid crystal device is bistable between a first state and a second state, the second state causing rotation of the polarization orientation of about ninety degrees more than the first state.

5. The laser scanning image system of claim 4, wherein the ferroelectric liquid crystal device is configured as a half wave retarder for the at least some of the light when in the second state.

* * * * *